United States Patent [19]
Gee

[11] 3,904,293
[45] Sept. 9, 1975

[54] OPTICAL METHOD FOR SURFACE TEXTURE MEASUREMENT

[76] Inventor: Sherman Gee, 106 Shaw Ave., Silver Spring, Md. 20904

[22] Filed: Dec. 6, 1973

[21] Appl. No.: 422,244

[52] U.S. Cl. ............................ 356/118; 356/120
[51] Int. Cl.² ..................... G01J 4/00; G01B 11/30
[58] Field of Search .......... 356/109, 114, 118, 120, 356/116, 119, 212, 102

[56] References Cited
UNITED STATES PATENTS

| | | | |
|---|---|---|---|
| 2,253,054 | 8/1941 | Tuttle et al. | 356/120 |
| 3,060,793 | 10/1962 | Wells | 356/118 |
| 3,345,907 | 10/1967 | Wada | 356/116 X |
| 3,502,888 | 3/1970 | Stites | 356/118 |
| 3,533,697 | 10/1970 | Hughes | 356/120 X |
| 3,565,568 | 2/1971 | Hock | 356/118 |
| 3,572,938 | 3/1971 | Bradford | 356/119 X |
| 3,623,814 | 11/1971 | Buhrer | 356/114 |
| 3,653,767 | 4/1972 | Liskowitz | 356/102 |
| 3,667,846 | 6/1972 | Nater et al. | 356/120 |
| 3,748,484 | 7/1973 | Covault | 356/118 X |
| 3,807,868 | 4/1974 | Simila | 356/118 |

Primary Examiner—Gerard R. Strecker
Attorney, Agent, or Firm—R. S. Sciascia; J. A. Cooke; Sol Sheinbein

[57] ABSTRACT

A non-contact method for measuring fine and coarse textural characteristics of material surfaces by detecting the light reflected from the surface and analyzing the degree of depolarization of the polarized incident light. The surface may be either stationary or moving with respect to the measuring system.

2 Claims, 2 Drawing Figures

OPTICAL METHOD FOR SURFACE TEXTURE MEASUREMENT

BACKGROUND OF THE INVENTION

This invention relates generally to the measurement of surface texture (roughness) and more particularly for the measurement of highway pavement surface textural characteristics.

The surface qualities of a highway pavement determines to a large degree the conditions under which safe driving can be maintained. The ultimate objective is to employ pavement material which will reduce the frequency and severity of highway accidents due to skidding and loss of control of the vehicle under various driving conditions.

The pavement-vehicle interaction is affected by the textural characteristics of the pavement, such as the coefficient of friction, road roughness and geometrical design factor. Pavement material with textural characteristics which would increase skid resistance and reduce the hydroplaning effect on wet surfaces is desired.

In order to relate textural characteristics to the dynamic pavement vehicle interactions, a low-cost method is needed to measure the road surface texture so that the surface data can be correlated with vehicle road-handling properties. An additional requirement is that the instrument to measure surface texture should be capable of being mounted on a vehicle moving at normal highway speeds to avoid disrupting existing highway traffic. Prior highway pavement surface measuring devices did not provide a non-contact method capable of providing near instantaneous response to pavement surfaces texture characteristics from a moving vehicle operating at normal highway speeds.

SUMMARY OF THE INVENTION

Accordingly, the present invention provides a system to measure the polarization characteristics of light reflected from the pavement surface. By illuminating the road surface with linearly polarized light such as from a laser source mounted on a moving vehicle, the reflected light will become depolarized as a result of diffuse scattering from the textured road surface. The reflected light will generally be elliptically polarized, the degree of ellipticity being dependent on the pavement textural characteristics. A measure of the surface textural characteristics is then obtained by determining the degree of depolarization experienced by the reflected light.

OBJECTS OF THE INVENTION

It is therefore an object of the present invention to provide a highly reliable and relatively economical device for performing textural measurements of material surfaces.

Another object of the present invention is to provide a device for measuring highway pavement surface texture without interfering with existing highway traffic.

Yet another object of the present invention is to provide a low-cost non-contact device for sensing road-pavement surface textural characteristics from a moving vehicle.

Still another object of the present invention is to provide rapid and accurate road inspection.

Another object of the present invention is to provide a surface measuring device on a moving vehicle which accuracy is desensitized to vehicle unsteadiness.

A still further object of the present invention is to provide textural measurements utilizing the polarization state of light.

These and other objects and advantages of the present invention will become apparent from the following description of the illustrative embodiment of the invention taken in conjunction with the accompanying drawings in which.

DESCRIPTION OF THE PREFERRED EMBODIMENTS

Figure 1:
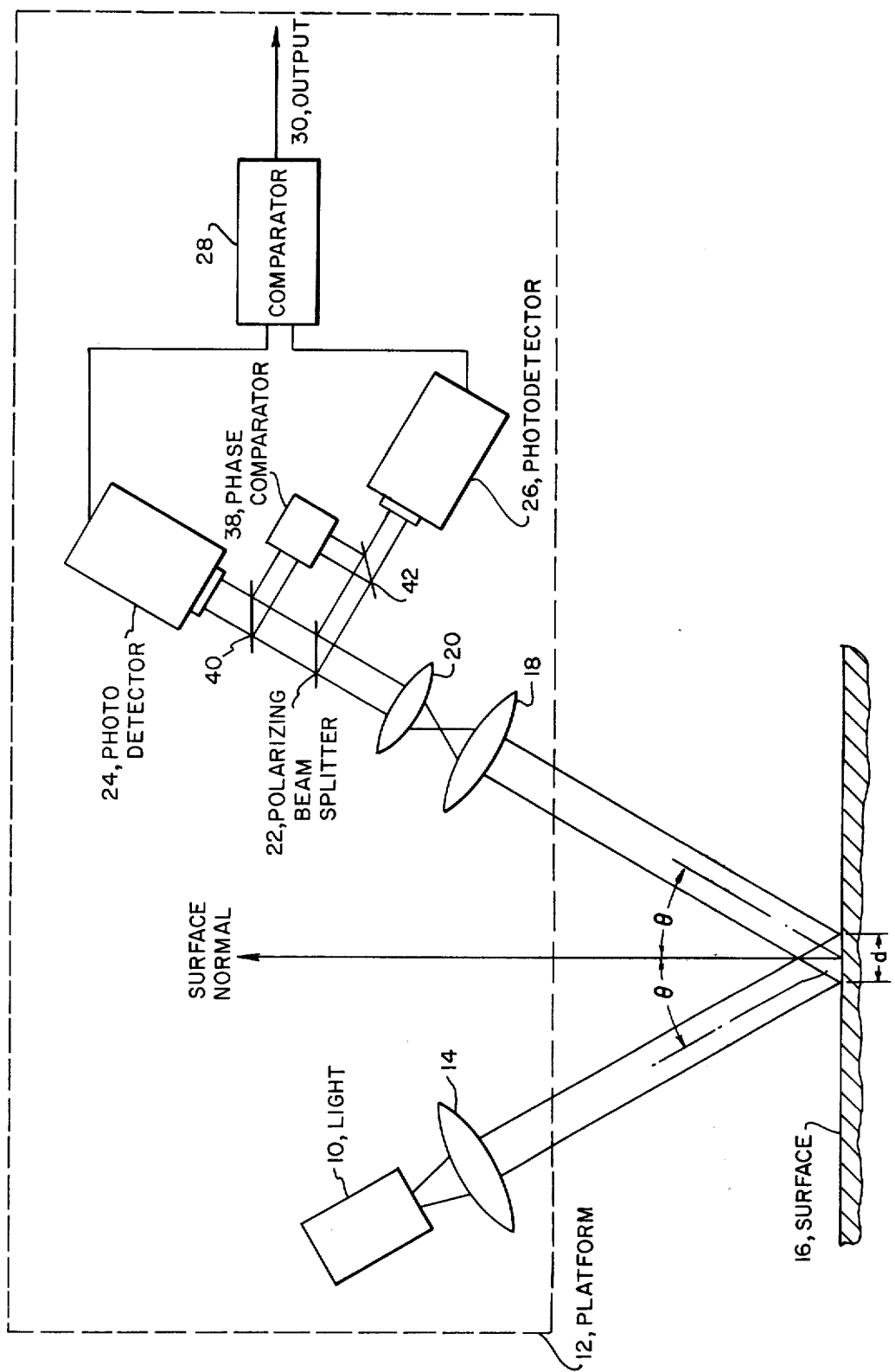
FIG. 1 illustrates in block diagram form one embodiment of the invention.

Referring now to the drawings, wherein like reference numerals designate corresponding parts throughout the several views, FIG. 1 shows optical light source 10 mounted on platform 12, which can be in motion relative to a surface 16. Light source 10 may be a helium-neon type laser operating at $0.6328\mu$ wavelength, but any wavelength of the optical spectrum ($0.3\mu$–$100\mu$) can be utilized. The helium-neon type was chosen due to the ready availability of optical components at this wavelength. Collimating lens 14 collimates the linearly polarized laser light (although any other polarization may be utilized) which is then incident on the surface 16 (which may be a highway, airstrip or the like) at some angle with respect to the surface normal. The illuminated area on the surface 16 has a diameter $d$, chosen to be many times the mean microprofile width of the surface texture. In this way, an effective statistical average of the random surface microprofile is represented in the properties of the reflected light. The light reflected from surface 16 is collected by collecting aperture 18 and directed by lens 20 to a polarizing beam-splitter 22 which separates its principal polarized (incident) and orthogonally polarized (depolarized) wave components. These two components are then separately detected in photodetectors 24 and 26, respectively. The ratio of the mean amplitudes of the outputs of photodetectors 24 and 26 as obtained by conventional comparator 28 provides a measure of the wave depolarization caused by the textural characteristics surface 16. Comparator output signal 30 is used to drive a meter or other appropriate indicator device.

The laser 10 and optical detection apparatus can readily be mounted on platform 12. As the platform 12 moves relative to the surface 16, a fluctuating electrical signal will be generated at the photodetector outputs 24 and 26 on a real-time basis. Changes in the surface texture will cause corresponding changes in the detected signal characteristics.

Figure 2:
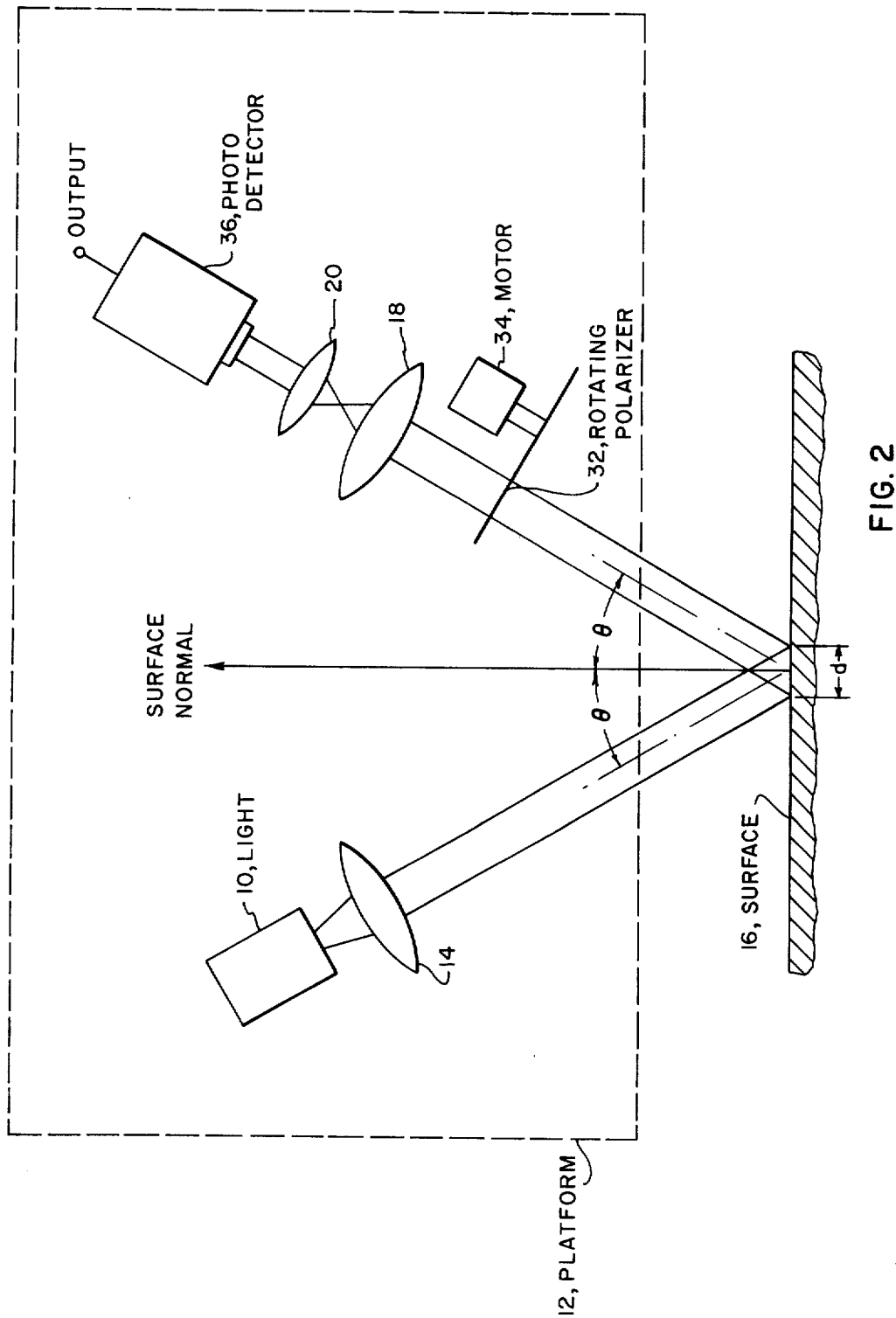
FIG. 2 illustrates in block form a second embodiment of the invention.

If a complete determination of the polarization characteristics (i.e., orientation of ellipse and sense of rotation) is needed to distinguish between different surface 16 materials, the relative phase of the two components can be determined utilizing a phase comparator 38 receiving light reflected from partially reflective mirror 40 in the path of the principal component and partially reflective mirror 42 in the path of the orthogonal wave component. An alternative receiving system is illustrated in FIG. 2 wherein a conventional rotating polarizer 32, driven by a conventional motor 34, in front of a single photodetector 36 can be employed for measuring the depolarization of the scattered light. In this case the rotating polarizer 32 produces a periodic signal at the photodetector 36 output where the signal peak is a measure of the principal polarization component and the signal minimum is a measure of the orthogonal polarization component.

The accuracy of photodetector outputs 24 and 26 is desensitized to changes in the light irradiance incident on the collecting optics due to platform 12 motion and light source 10 fluctuations because these changes produce proportionately equal changes in the two polarization components measured, thereby making the ratio of the two detected outputs independent of fluctuations in the received light intensity. Consequently, for a given reflection surface, the ratio of the two detected signals will remain constant regardless of light fluctuations caused by source fluctuations or changes due to unsteady platform 12 motion. Furthermore, the size of the collecting aperture 18 could be chosen large enough such that most of the reflected light can be still be collected under most conditions of beam shift caused by unsteady platform motion.

Beam shift due to platform 12 bouncing can also be minimized by making the incidence angle $\theta$ small. Beam shift due to a platform 12 bounce of distance $y$ causes a beam displacement of approximately $2y \sin \theta$. If $\theta$ is small, the maximum beam shift will only be a fraction of the bounce displacement $y$.

It can therefore be seen that the invention very effectively provides a non-contact and accurate surface textural measurement. Alternatives to the preferred embodiment could employ different lasers. The invention is not limited to linearly polarized light incident on the surface. Mounting of the optical equipment on platform 12 may be accomplished in any suitable and convenient manner. Rather than use a polarizing beam splitter, an ordinary beam splitter can be employed followed by two polarizing filters oriented in such a fashion that only the principal or orthogonal components of the reflective wave are incident on their respective photodetector.

The angle of incidence and reflection, $\theta$, can also be varied. In the special case when $\theta=0$, a backscatter arrangement may be employed.

As is obvious to those skilled in the art, the disclosed apparatus could be mounted on a stationary platform and the surface move relative to the apparatus. Similarly, the apparatus could measure textural characteristics of devices other than roads, such as textiles, foods, processed materials, etc. The definition of surface does not preclude penetration into the reflecting material to some extent.

The invention is not limited to the embodiments described above, but all changes and modifications thereof not constituting departures from the spirit and scope of the invention are intended to be covered by the following claims.

What is claimed as new and desired to be secured by Letters Patent of the United States is:

1. A method for instantaneously measuring road pavement surface textural characteristics from a moving vehicle comprising the steps of:

directing a beam of polarized light from said moving vehicle at an angle of incidence $\theta$ with respect to the surface normal; collecting the light reflected from said surface at an angle of reflection $\theta$ with respect to the surface normal;

separating the collected light by means of a device for splitting the light into a first principal polarized wave component and second orthogonal polarized wave component of polarized light; directing said first principal polarized wave component into a first photodetector and said second orthogonal polarized wave component into a second photodetector;

and comparing the outputs of said first and second photodetectors by measuring the ratio of the amplitudes of said first and second components of light to indicate the change in polarization of said light source, said polarization change providing the textural characteristics of said road pavement surface.

2. A method as recited in claim 1 wherein said polarized light is linearly polarized, said vehicle is moving at normal road speed, said light is a laser, and said separator is a beam splitter.

* * * * *

UNITED STATES PATENT OFFICE
CERTIFICATE OF CORRECTION

Patent No. 3,904,293　　　　　　　　Dated September 9, 1975

Inventor(s) SHERMAN GEE

It is certified that error appears in the above-identified patent and that said Letters Patent are hereby corrected as shown below:

Column 1, after the Title insert the paragraph

--STATEMENT OF GOVERNMENT INTEREST--

The invention described herein may be manufactured and used by or for the Government of the United States of America for governmental purposes without the payment of any royalties thereon or therefor.--.

Signed and Sealed this

*thirtieth* Day of *December 1975*

[SEAL]

*Attest:*

RUTH C. MASON　　　　　　　　C. MARSHALL DANN
*Attesting Officer*　　　　　　*Commissioner of Patents and Trademarks*